(12) United States Patent
Ladikov et al.

(10) Patent No.: US 10,474,812 B2
(45) Date of Patent: Nov. 12, 2019

(54) SYSTEM AND METHOD FOR SECURE EXECUTION OF SCRIPT FILES

(71) Applicant: Kaspersky Lab ZAO, Moscow (RU)

(72) Inventors: Andrey V. Ladikov, Moscow (RU); Andrey Y. Solodovnikov, Moscow (RU)

(73) Assignee: AO KASPERSKY LAB, Moscow (RU)

( * ) Notice: Subject to any disclaimer, the term of this patent is extended or adjusted under 35 U.S.C. 154(b) by 0 days.

(21) Appl. No.: 14/803,425

(22) Filed: Jul. 20, 2015

(65) Prior Publication Data

US 2016/0180086 A1 Jun. 23, 2016

(30) Foreign Application Priority Data

Dec. 19, 2014 (RU) ................................. 2014151466

(51) Int. Cl.
*G06F 21/53* (2013.01)

(52) U.S. Cl.
CPC .................................... *G06F 21/53* (2013.01)

(58) Field of Classification Search
CPC ........................................................ G06F 21/53
USPC .......................................................... 726/23
See application file for complete search history.

(56) References Cited

U.S. PATENT DOCUMENTS

| | | | | |
|---|---|---|---|---|
| 6,779,179 B1 * | 8/2004 | Romm | ................ | G06F 9/44505 709/203 |
| 7,698,744 B2 * | 4/2010 | Fanton | .................... | G06F 21/10 713/150 |
| 8,950,007 B1 * | 2/2015 | Teal | ...................... | G06F 21/554 726/30 |
| 2002/0099952 A1 | 7/2002 | Lambert et al. | | |
| 2004/0181677 A1 * | 9/2004 | Hong | .................... | G06F 21/563 713/188 |
| 2005/0091511 A1 * | 4/2005 | Nave | ........................ | G06F 8/61 713/185 |
| 2005/0177635 A1 * | 8/2005 | Schmidt | .................... | G06F 9/52 709/226 |

(Continued)

FOREIGN PATENT DOCUMENTS

| | | |
|---|---|---|
| EP | 1084464 B1 | 7/2011 |
| RU | 2454705 C1 | 6/2012 |
| WO | WO 9935583 A2 * | 7/1999 ............. G06F 21/51 |

*Primary Examiner* — Peter C Shaw
(74) *Attorney, Agent, or Firm* — Arent Fox LLP; Michael Fainberg

(57) ABSTRACT

Disclosed are a system and method for secure execution of script files. An example method includes providing a security container associated with a script interpreter, wherein the security container includes at least action limiting policies for the interpreter; detecting an attempt by the script interpreter to execute a script file; determining using the security container whether the script file is a trusted script file; allowing the script interpreter to execute a trusted script file; intercepting actions of the interpreter during execution of the script file; determining using the security container whether an intercepted action is permitted; when the intercepted action is permitted, determining using the security container whether any limitations are associated with the intercepted action; and when a limitation is associated with the intercepted action, applying the limitation to the intercepted action during the execution of the script file.

18 Claims, 4 Drawing Sheets

(56) References Cited

U.S. PATENT DOCUMENTS

| | | |
|---|---|---|
| 2006/0187849 A1 | 8/2006 | Hamedi |
| 2006/0225036 A1 | 10/2006 | Pandit et al. |
| 2009/0138937 A1* | 5/2009 | Erlingsson .......... H04L 63/1416 726/1 |
| 2011/0225655 A1* | 9/2011 | Niemela ............... G06F 21/566 726/24 |
| 2011/0283363 A1* | 11/2011 | Verschoor ............... G06F 21/53 726/26 |
| 2014/0052838 A1 | 2/2014 | Giacomoni et al. |
| 2015/0096048 A1* | 4/2015 | Zhang ................ G06F 21/6218 726/27 |

\* cited by examiner

SYSTEM AND METHOD FOR SECURE EXECUTION OF SCRIPT FILES

CROSS-REFERENCE TO RELATED APPLICATIONS

This application claims benefit of priority under 35 U.S.C. 119(a)-(d) to a Russian Application No. 2014151466 filed on Dec. 19, 2014, which is incorporated by reference herein.

FIELD OF TECHNOLOGY

The disclosure relates generally to the field of computer security, and more specifically, to systems and method of secure execution of script files on a computer.

BACKGROUND

Several approaches exist for protecting a computer against malicious software (i.e., malware). In one approach, an antivirus application allows execution of all programs on the computer, but detects and blocks malicious programs. The detection of malware can be done via a search for the signature of the malware in one of the antivirus databases, heuristic analysis, behavioral patterns analysis, proactive protection or other techniques. In another approach, only trusted programs are allowed to run while being monitored, and untrusted software is completely blocked (for example, its execution is prohibited). This second approach for ensuring computer safety is often called the "default deny" protection mode.

Besides malicious programs, harm can also be done to a computer by all kinds of files containing unsafe scripts. The script files are typically executed by special programs known as interpreters, which understand the format and syntax of the script file and perform actions in the computer system as specified in these script files. The interpreter program, which also executes the script, may be trusted and will even be executed in "default deny" mode.

Antivirus applications must be adept in detecting malicious scripts in order to sensure safety of computer systems particularly those operating in "default deny" mode.

SUMMARY

Disclosed are example systems, methods and computer program products for secure execution of script files. In one aspect, an example method includes providing a security container associated with a script interpreter, wherein the security container includes at least action limiting policies for the interpreter; detecting, by a processor, an attempt by the script interpreter to execute a script file; determining using the security container whether the script file is a trusted script file; allowing, by the processor, the script interpreter to execute a trusted script file; intercepting, by the processor, actions of the interpreter during execution of the script file; determining using the security container whether an intercepted action is permitted; when the intercepted action is permitted, determining using the security container whether any limitations are associated with the intercepted action; and when a limitation is associated with the intercepted action, applying, by the processor, the limitation to the intercepted action during the execution of the script file.

In one example aspect, applying the limitation includes performing a virtual action instead of the intercepted action.

In one example aspect, the action limiting policies depend on one or more of a version of the operating system, a type of account record, a hardware of the computer, a network segment in which the computer is located.

In one example aspect, the security container stores action limiting policies that determine limits on both the actions of the interpreter and actions of script files executed by the interpreter.

In one example aspect, the security container security container stores a list of allowed disk read/write operations, and a set of allowed operations with the operating system.

In one example aspect, the security container security container stores allowed network operations governing access to the network for the interpreter.

In another aspect, an example system for execution of script files includes: a data storage for storing a security container associated with a script interpreter, wherein the security container includes at least action limiting policies for the interpreter; and a hardware processor coupled to the data storage and configure to: detect an attempt by the script interpreter to execute a script file; determine using the security container whether the script file is a trusted script file; allow the script interpreter to execute a trusted script file; intercept actions of the interpreter during execution of the script file; determine using the security container whether an intercepted action is permitted; when the intercepted action is permitted, determine using the security container whether any limitations are associated with the intercepted action; and when a limitation is associated with the intercepted action, apply the limitation to the intercepted action during the execution of the script file.

In yet another aspect, an example non-transitory computer readable medium comprising computer executable instructions for execution of script files, including instructions for: providing a security container associated with a script interpreter, wherein the security container includes at least action limiting policies for the interpreter; detecting an attempt by the script interpreter to execute a script file; determining using the security container whether the script file is a trusted script file; allowing the script interpreter to execute a trusted script file; intercepting actions of the interpreter during execution of the script file; determining using the security container whether an intercepted action is permitted; when the intercepted action is permitted, determining using the security container whether any limitations are associated with the intercepted action; and when a limitation is associated with the intercepted action, applying the limitation to the intercepted action during the execution of the script file.

The above simplified summary of example aspects serves to provide a basic understanding of the present disclosure. This summary is not an extensive overview of all contemplated aspects, and is intended to neither identify key or critical elements of all aspects nor delineate the scope of any or all aspects of the present disclosure. Its sole purpose is to present one or more aspects in a simplified form as a prelude to the more detailed description of the disclosure that follows. To the accomplishment of the foregoing, the one or more aspects of the present disclosure include the features described and particularly pointed out in the claims.

BRIEF DESCRIPTION OF THE DRAWINGS

The accompanying drawings, which are incorporated into and constitute a part of this specification, illustrate one or more example aspects of the present disclosure and, together with the detailed description, serve to explain their principles and implementations.

DETAILED DESCRIPTION

Example aspects are described herein in the context of a system, method and computer program product for secure execution of script files. Those of ordinary skill in the art will realize that the following description is illustrative only and is not intended to be in any way limiting. Other aspects will readily suggest themselves to those skilled in the art having the benefit of this disclosure. Reference will now be made in detail to implementations of the example aspects as illustrated in the accompanying drawings. The same reference indicators will be used to the extent possible throughout the drawings and the following description to refer to the same or like items.

Generally, there are two types of script interpreters in existence. A first type is a simple interpreter analyzes and immediately executes (interprets) a script file command by command (or line by line) as the source code of the file arrives at the input of the interpreter. A second type is an interpreter of compiling type, which is a system consisting of a compiler that translates the source code of the file into an intermediate representation, such as a byte code, and an interpreter, which executes the resulting intermediate code.

In order to ensure the security of a computer on which a script file is being executed, it is desirable on the one hand to analyze the syntax of the script file, the sequence of commands, the result of their execution, and the intermediate representation of the code. On the other hand, regardless of the type and purpose of the interpreter, its actions can be limited. In security systems working in "default deny" mode, allowed actions and conditions for the interpreters may be assigned to said interpreters, after which the execution of the script file by the interpreter is monitored and all disallowed actions are blocked (denied).

Figure 1:
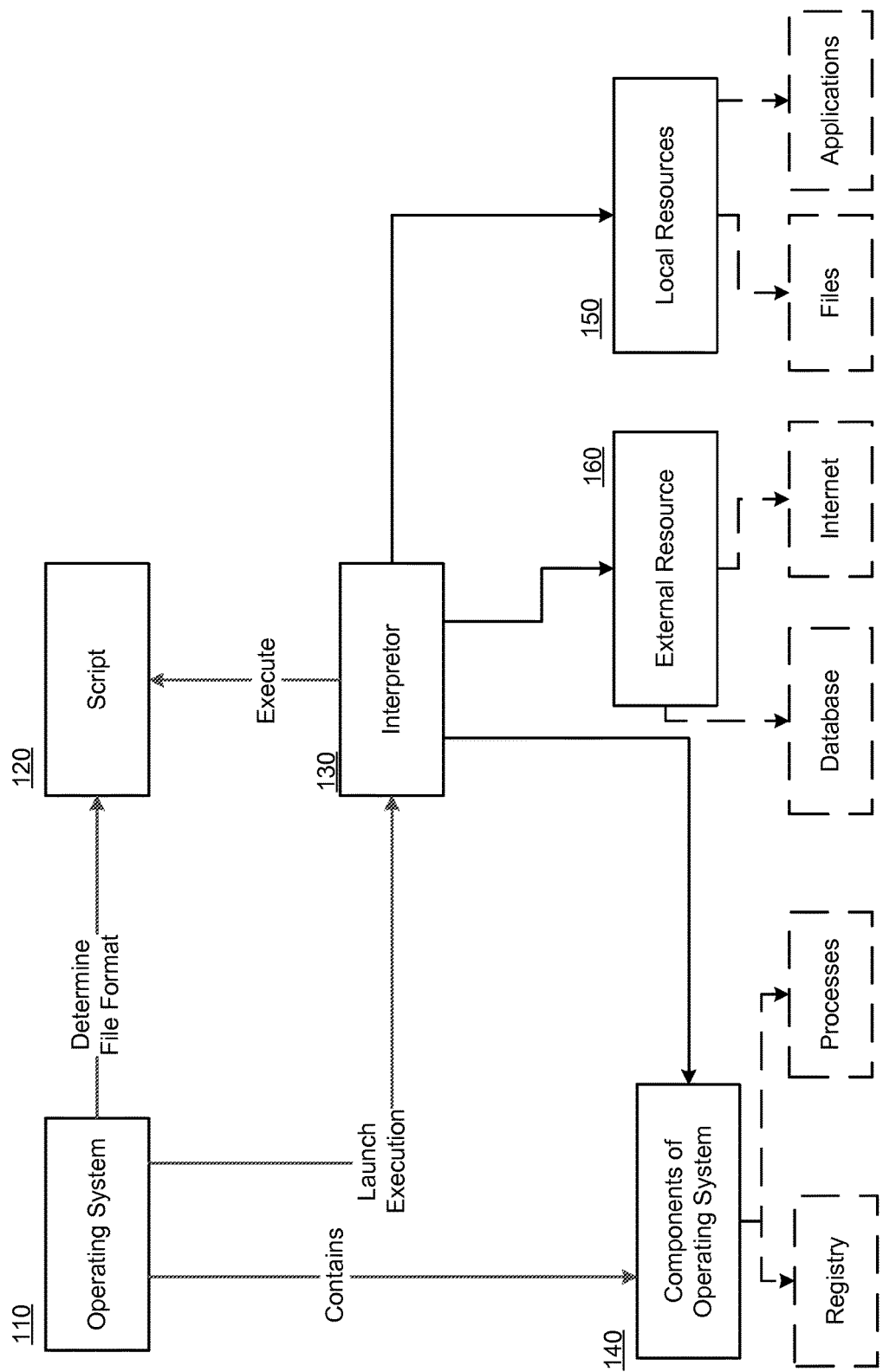
FIG. 1 shows an example of the working of an interpreter with a script file.

FIG. 1 shows an example of the working of an interpreter with a script file. Each script file 120 on the computer is executed after the loading of the operating system 110 by a particular interpreter program 130. After the loading of the script file 120 by the operating system 110 (such as Windows), the format of the script file 120 is determined. The format of the script file 120 may be determined by the operating system 110, for example, from the file extension or other known methods. The operating system 110 then makes a choice of the script processor or, in other words, the interpreter program 130. This can be done, for example, with the help of the registry of the operating system 110, which keeps all correspondences and links of file formats with their executive programs. The selected interpreter (script processor) 130 is then launched, and it begins to execute the script file 120.

During the execution of the script file 120, the interpreter 130 may perform operations with local resources 150 (such as disk operations, execution of other applications, etc.), access external resources 160 (for example, open Internet connections, communicate with database servers, etc.), interact with components of the operating system 140 (such as with the services of the operating system) when necessary, perform operations on the registry of the operating system, run various processes and monitor their execution. In one example aspect, the interpreter 130 interacts with the management tools of the operating system (for example, with the help of Windows Management Instrumentation, WMI). In turn, the management instrumentation of the operating system enables interaction with: the operating system; applications; equipment; networks; and other controllable components.

It is evident from the above that the interpreter 130 during the execution of a script file 120 has broad possibilities for interaction with the operating system 110. Malicious scripts can cause harm to the computer and inflict damage on the data present on the computer. For example, they can cause damage to files or loss of their confidentiality.

Figure 2:
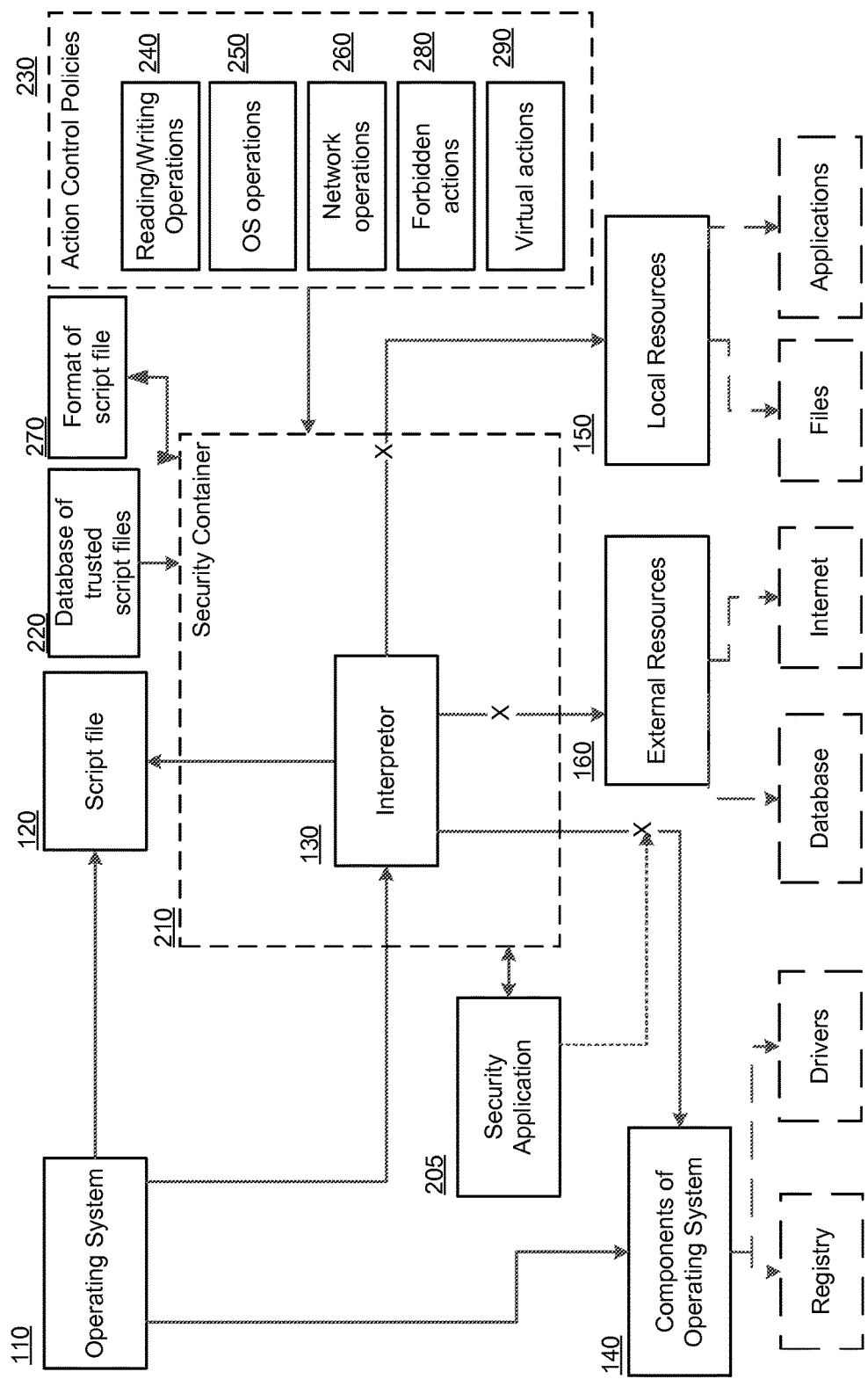
FIG. 2 shows an example of the working of an interpreter with a script file in a system containing a security application working in "default deny" mode.

FIG. 2 shows an example of the working of an interpreter with a script file in a system containing a security application working in "default deny" mode. When a security application 205 (such as an antivirus application) is installed in the operating system 110, which is able to work in "default deny" mode, the security application 205 may create a security container 210 that contains action limiting policies 230 for the interpreter 130. The security container 210 makes it possible to monitor the actions of the interpreter 130 in the computer system according to action limiting policies 230 for the interpreter 130, for example, by monitoring the calling of application programming interface (API) functions or by replacing these calls when they are executed by the interpreter 130. In one example aspect, all actions of the interpreter 130 not allowed by the security container may be blocked by the security application 205. In the general case, the security container 210 is adapted by the security application 205 to the execution environment of the computer system. Particularly, the action limiting policies 230 may depend on the version of the operating system 110, the type of user account, the hardware of the computer, and the network segment in which the computer is located.

In one example aspect, the security container 210 contains action limiting policies 230 which determine limits on both the actions of the interpreter 130 and the actions of the scripts executed by the interpreter. For example, the interpreter may be allowed to run applications of a certain category (such as Web browsers) or to run any child processes.

In one example aspect, the security container 210 may contain a list of allowed disk read/write operations 240. For example, reading of certain file formats or any writing to disk is allowed.

In yet another example aspect, the security container 210 may contain a set of allowed operations 250 with the operating system 110 and/or with its components. For example, the rules may allow accessing the registry of the operating system 110 and modifying it, interaction with services of the operating system 110 (for example, a list of services allowed for interaction with the interpreter 130), permissions to work with drivers, with the script server of the operating system 110 and with the management tools of the operating system 110.

In one example aspect, the security container 210 determines the allowed network operations governing access to the network 260 for the interpreter 130, for example, access to the Internet, local area network segments which are allowed for access, and access permission depending on the user account record under which the interpreter 130 is running (e.g., administrator account with broad privileges or user account with limited privileges).

In one example aspect, the system may also maintain information about trusted script files in a repository of trusted script files 220. The repository of trusted script files 220 may reside either on the user's computer or on a network server. In one example, a script file 120 which has been recognized to be safe as a result of an antivirus check is considered to be trusted. In another example, information about the script file 120 is added to the repository of trusted script files 220 by the network administrator. In yet another example, a script file 120 is considered to be trusted if it has been deemed to be trusted on one or more other computers of the network, that is, by using the "wisdom of the crowd" technique. In yet another example, a script file 120 is deemed to be trusted if it was obtained from a trusted source.

In one example aspect, the repository of trusted script files 220 saves unique information characterizing the script file 120, such as the digital signature or hash sum of the file. In one example, information about the path (the location on the disk or the network path to the file) and format of a trusted script file may be also stored in the repository 220.

In one example aspect, if the script file 120 is altered in the process of execution by the interpreter, information about this may be saved in implicit form. For example, if the script file 120 is a text file (data in the file is represented in text form, line by line), and several lines are altered in the new version of the generated file, the repository of trusted script files 220 may save the hash sum of the unaltered file portion and the numbers of the lines being altered.

In one example aspect, the security container 210 may contain at least a portion of information from the repository of trusted script files 220, and the security application 205 may use this information to block the running of untrusted script files 120.

In one example aspect, the security container 210 may also contain a list of prohibited actions 280 for the interpreter 130. In the event of the executing of a prohibited action 280 by the interpreter 130, the execution of the entire script file 120 may be blocked by the security application 205.

In one example aspect, the security container 210 may contain virtual actions 290 for the interpreter 130. A virtual action may correspond to an allowed action. In one example, the virtual action 290 is an action which is executed by the operating system 110 instead of an allowed action. The security application 205 in this case intercepts the allowed action being executed by the interpreter 130 and replaces it with a virtual action 290. For example, the obtaining of data from a network is replaced by the reading of data from a file. In one example, more than one virtual action 290 may correspond to one allowed action. In another example, a virtual action is defined as an action which is not executed in the operating system 110, but the result of the execution is generated by the security application 205 and returned to the interpreter 130. For example, the interpreter 130 requests a writing to the registry, the security application 205 intercepts the request, does not perform the writing to the registry, but returns to the interpreter 130 a result reflecting successful writing to the registry.

In one example aspect, one security container 210 may be created for one interpreter 130. In another example aspect, one security container 210 may created for several interpreters 130. In another example aspect, several security containers 210 may correspond to one interpreter 130. If one security container 210 contains permission, e.g., to access the network, while another container does not, then a more restrictive action of the two may be selected, e.g., access to the network may be blocked by the security application 205 during the working of the interpreter 130.

In one example aspect, the security container 210 may contain a list of permissions for different file formats not supported by the interpreter 130. Supported file format includes file format that can be executed by the interpreter 130. That is, when opening a file in a supported format, the interpreter 130 begins to execute code of this file. Unsupported file format includes file format whose syntax the interpreter 130 cannot or may not execute. In one exemplary aspect, the security container 210 determines based on list of permissions that the interpreter 130 is attempting to access files of unsupported formats for reading and writing, and blocks this access. For example, an application triggers execution of a script file with extension php that contains a set of php commands. The security application 205 intercepts this request and runs the interpreter php.exe (php—a cross-platform interpreter), which begins execution of the script php file because php format is supported. At one point, while executing the code of the php file, the interpreter php.exe may attempt to open a file with the extension "jpg", which is an unsupported format. But jpg is an image file, which according to the list of permissions in the security container 220 is allowed to be read by interpreter php.exe. However, if the interpreter php.exe attempts to open a file with the extension "bat", which is an unsupported format, but the opening of such a file might not be safe. The security container 210, can prohibit reading a file format "bat" to interpreter php.exe.

In one example aspect, the security container 210 may be modified, for example, by the network administrator.

An example of controlling and limiting of the execution of a script file 120 in an operating system 110 is presented below. The operating system 110 makes an attempt to run the file. The operating system 110 determines the interpreter 130 corresponding to the script file 120 and launches the interpreter 130. The security application 205 then intercepts the attempt by interpreter 130 to execute the script file. The security application 205 searches for information on the script file 120 in the repository of trusted script files 220. If the script file 120 is marked as trusted in the repository 220, the security application 205 determines all the security containers corresponding to the interpreter 130. The security application 205 then allows (does not block) the execution of the script file 120. During the execution of the script file 120 the security application 205 intercepts actions being performed by the interpreter 130. Actions of the interpreter 130 not allowed by the security containers 210 are blocked.

Figure 3:
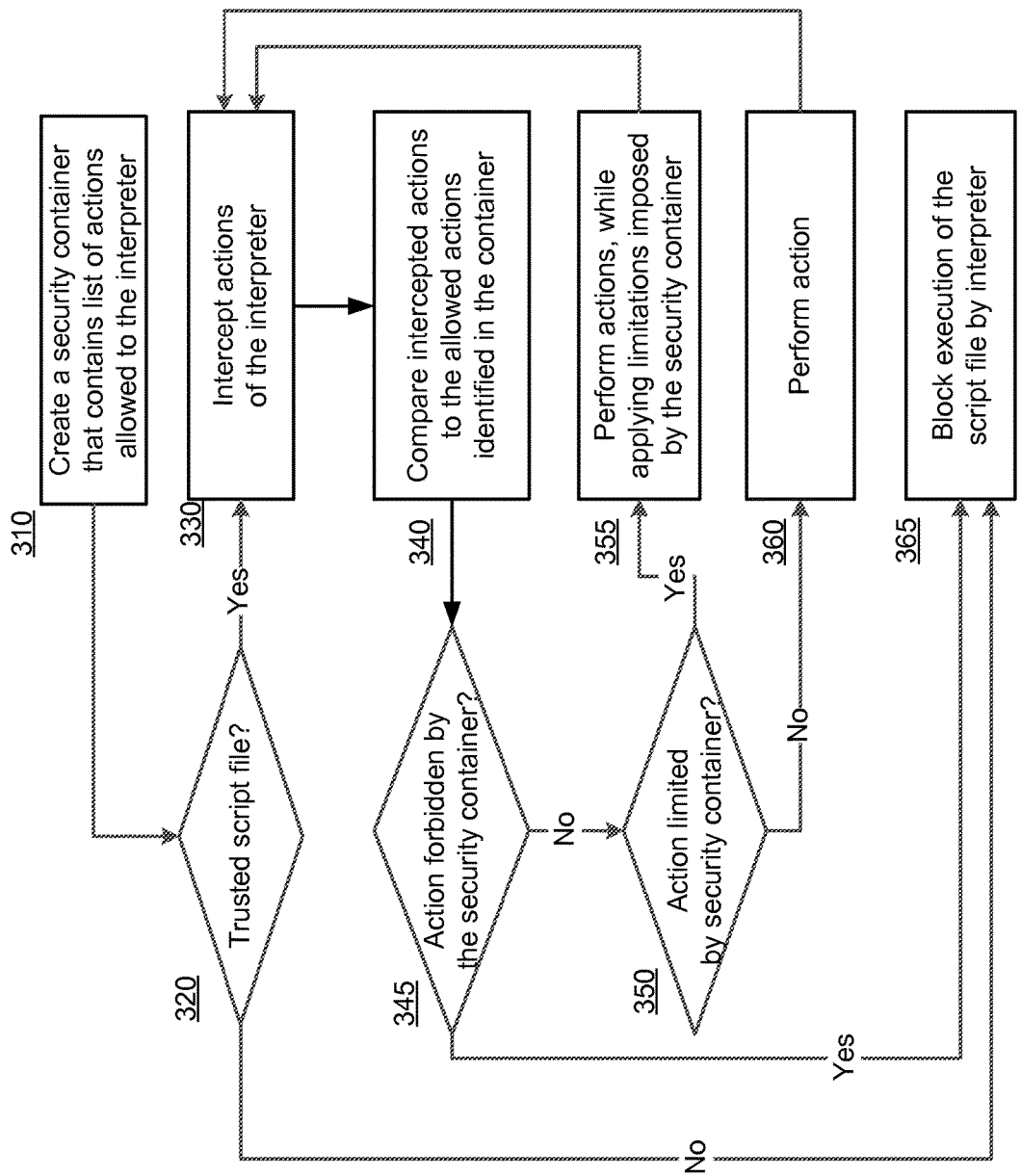
FIG. 3 shows an example method of blocking the execution a script file.

FIG. 3 shows an example method of blocking the execution by an interpreter of a script file when the interpreter performs actions not allowed by the security container of the interpreter. At the initial step 310, a security container is created, which contains a set of action limiting policies 230 for the interpreter 130. In one example, the security container may be created by a security application 205, such as an antivirus software. In one example aspect, the security container contains information about trusted script files 120. In one example aspect, the security container of the interpreter contains a list of disk read and write operations 240 which are allowed to the interpreter 130. In another example aspect, the security container for the interpreter contains operations allowed with the operating system 250. In yet another example aspect, the security container of the interpreter contains a list of network operations 260. In yet another example aspect, the security container of the interpreter contains a list of forbidden actions 280. In yet another example aspect, the security container of the interpreter contains a list of virtual actions 290 for the interpreter 130. In this case, several security containers 210 may correspond to one interpreter 130.

Next, in step 320, determining whether the script file 120 is trusted or not. In one example aspect, the security application 205 may be used to perform checking the trustworthiness of the script file 120. The script file 120 is considered to be trusted if unique information characterizing the file of the script file (such as the digital signature or hash sum) complies with information stored in the security container. The execution of a trusted script file 120 is allowed. If the script file 120 is not trusted, its execution will be blocked 365.

Next, in step 330, the actions of the interpreter with the script file 120 are intercepted. The intercepting can be done, for example, by the security application 205.

Next, in step 340, the security application 205 may determine if the intercepted action corresponds to the security container 210 of the interpreter. In step 345, if the intercepted action is forbidden by the security container 210, the execution of the script file 210 by the interpreter 130 is blocked 365. In step 350, if the intercepted action is not restricted by the security container 210, it is executed 360. Otherwise, the step 355 is performed, applying the limitations specified in the security container 210. In one example, the limiting actions may include blocking execution of the action. In another example, the limiting action may include performing a virtual action instead of the actual intercepted action. In another example, the limiting action may include performing a requested network function (such as opening a Web page by the interpreter 130), but blocking any network traffic requested by that function. In yet another example, the limiting action may include, when the interpreter attempts to read a file, copying the file in another location by the security application, and in its place providing to the interpreter an empty file or a file filled with known secure content. The method then returns to step 330, where the intercepting of the actions of the interpreter 130 continues.

Figure 4:
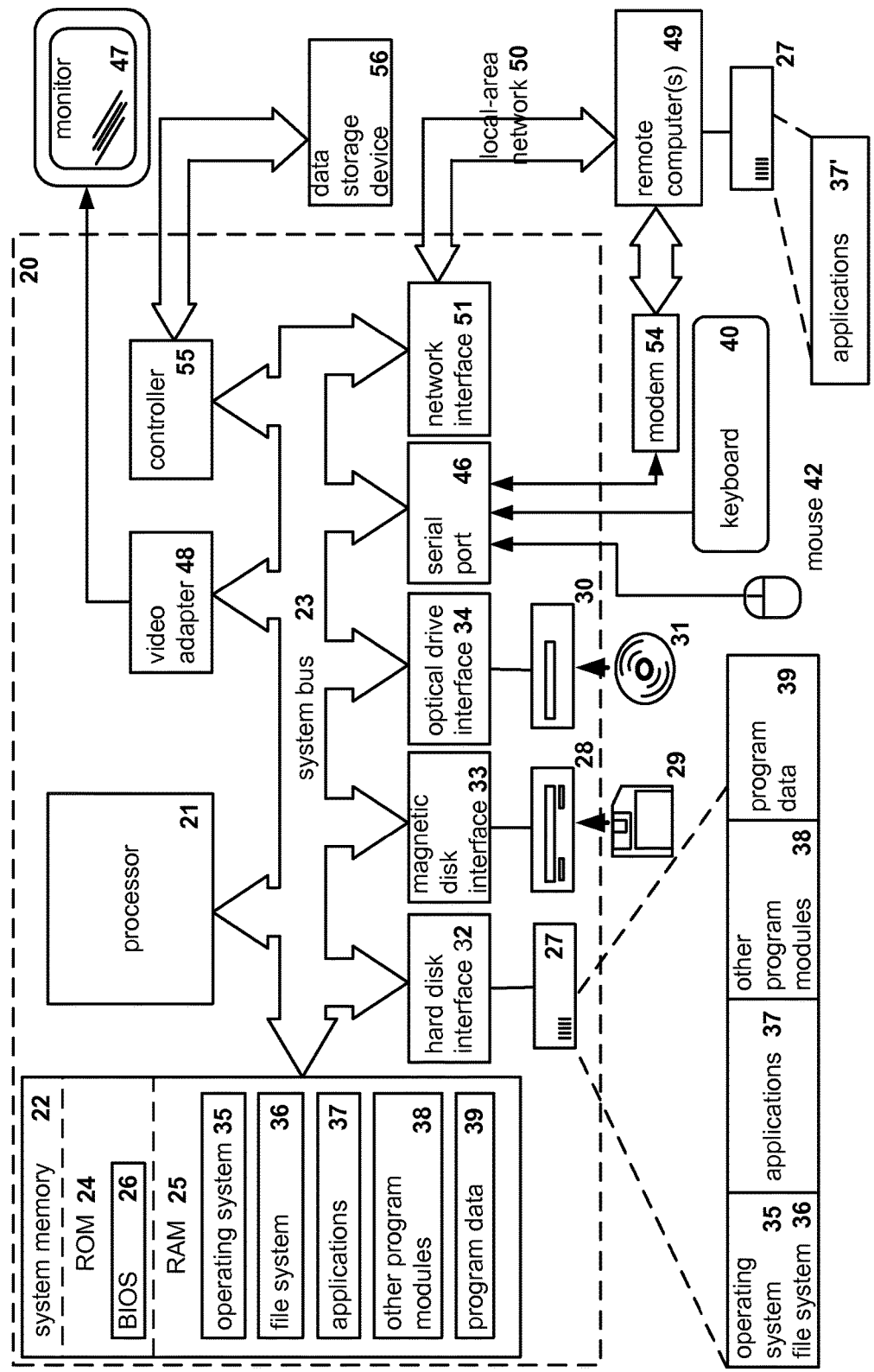
FIG. 4 shows an example of a general-purpose computer system on which the disclosed systems and method may be implemented.

FIG. 4 illustrates an example of a general-purpose computer system (which may be a personal computer or a server) on which the disclosed systems and method may be implemented. The computer system 20 includes a central processing unit 21, a system memory 22 and a system bus 23 connecting the various system components, including the memory associated with the central processing unit 21. The system bus 23 is realized like any bus structure known from the prior art, including in turn a bus memory or bus memory controller, a peripheral bus and a local bus, which is able to interact with any other bus architecture. The system memory includes read only memory (ROM) 24 and random-access memory (RAM) 25. The basic input/output system (BIOS) 26 includes the basic procedures ensuring the transfer of information between elements of the personal computer 20, such as those at the time of loading the operating system with the use of the ROM 24.

The personal computer 20, in turn, includes a hard disk 27 for reading and writing of data, a magnetic disk drive 28 for reading and writing on removable magnetic disks 29 and an optical drive 30 for reading and writing on removable optical disks 31, such as CD-ROM, DVD-ROM and other optical information media. The hard disk 27, the magnetic disk drive 28, and the optical drive 30 are connected to the system bus 23 across the hard disk interface 32, the magnetic disk interface 33 and the optical drive interface 34, respectively. The drives and the corresponding computer information media are power-independent modules for storage of computer instructions, data structures, program modules and other data of the personal computer 20.

The present disclosure provides the implementation of a system that uses a hard disk 27, a removable magnetic disk 29 and a removable optical disk 31, but it should be understood that it is possible to employ other types of computer information media 56 which are able to store data in a form readable by a computer (solid state drives, flash memory cards, digital disks, random-access memory (RAM) and so on), which are connected to the system bus 23 via the controller 55.

The computer 20 has a file system 36, where the recorded operating system 35 is stored, and also additional program applications 37, other program modules 38 and program data 39. The user is able to enter commands and information into the personal computer 20 by using input devices (keyboard 40, mouse 42). Other input devices (not shown) may be used: microphone, joystick, game controller, scanner, and so on. Such input devices usually plug into the computer system 20 through a serial port 46, which in turn is connected to the system bus, but they can be connected in other ways, for example, with the aid of a parallel port, a game port or a universal serial bus (USB). A monitor 47 or other type of display device is also connected to the system bus 23 across an interface, such as a video adapter 48. In addition to the monitor 47, the personal computer may be equipped with other peripheral output devices (not shown), such as loudspeakers, a printer, and so on.

The personal computer 20 is able to operate in a network environment, using a network connection to one or more remote computers 49. The remote computer (or computers) 49 are also personal computers or servers having the majority or all of the aforementioned elements in describing the nature of a personal computer 20, as shown in FIG. 3. Other devices may also be present in the computer network, such as routers, network stations, peer devices or other network nodes.

Network connections can form a local-area computer network (LAN) 50, such as a wired and/or wireless network, and a wide-area computer network (WAN). Such networks are used in corporate computer networks and internal company networks, and they generally have access to the Internet. In LAN or WAN networks, the personal computer 20 is connected to the local-area network 50 across a network adapter or network interface 51. When networks are used, the personal computer 20 can employ a modem 54 or other modules for providing communications with a wide-area computer network such as the Internet. The modem 54, which is an internal or external device, is connected to the system bus 23 by a serial port 46. It should be noted that the network connections are only examples and need not depict the exact configuration of the network, i.e., in reality there are other ways of establishing a connection of one computer to another by technical communication modules, such as Bluetooth.

In various aspects, the systems and methods described herein may be implemented in hardware, software, firmware, or any combination thereof. If implemented in software, the methods may be stored as one or more instructions or code on a non-transitory computer-readable medium. Computer-readable medium includes data storage. By way of example, and not limitation, such computer-readable medium may comprise RAM, ROM, EEPROM, CD-ROM, Flash memory or other types of electric, magnetic, or optical storage medium, or any other medium that may be used to carry or store desired program code in the form of instructions or data structures and that may be accessed by a processor of a general purpose computer.

In various aspects, the systems and methods described in the present disclosure in terms of modules. The term "module" as used herein refers to a real-world device, component, or arrangement of components implemented using hardware, such as by an application specific integrated circuit (ASIC) or field-programmable gate array (FPGA), for example, or as a combination of hardware and software, such as by a microprocessor system and a set of instructions to implement the module's functionality, which (while being executed) transform the microprocessor system into a special-purpose device. A module may also be implemented as a combination of the two, with certain functions facilitated by hardware alone, and other functions facilitated by a combination of hardware and software. In certain implementations, at least a portion, and in some cases, all, of a module may be executed on the processor of a general purpose computer (such as the one described in greater detail in FIG. 3 above). Accordingly, each module can be realized in a variety of suitable configurations, and should not be limited to any particular implementation exemplified herein.

In the interest of clarity, not all of the routine features of the aspects are disclosed herein. It will be appreciated that in the development of any actual implementation of the present disclosure, numerous implementation-specific decisions must be made in order to achieve the developer's specific goals, and that these specific goals will vary for different implementations and different developers. It will be appreciated that such a development effort might be complex and time-consuming, but would nevertheless be a routine undertaking of engineering for those of ordinary skill in the art having the benefit of this disclosure.

Furthermore, it is to be understood that the phraseology or terminology used herein is for the purpose of description and not of restriction, such that the terminology or phraseology of the present specification is to be interpreted by the skilled in the art in light of the teachings and guidance presented herein, in combination with the knowledge of the skilled in the relevant art(s). Moreover, it is not intended for any term in the specification or claims to be ascribed an uncommon or special meaning unless explicitly set forth as such.

The various aspects disclosed herein encompass present and future known equivalents to the known modules referred to herein by way of illustration. Moreover, while aspects and applications have been shown and described, it would be apparent to those skilled in the art having the benefit of this disclosure that many more modifications than mentioned above are possible without departing from the inventive concepts disclosed herein.

The invention claimed is:

1. A method for execution of script files, the method comprising:
   providing a security container associated with a script interpreter, wherein the security container includes at least action limiting policies for the interpreter;
   intercepting, by a processor, actions of the interpreter during execution of a script file comprising a trusted script file;
   determining using the security container whether an intercepted action is permitted;
   responsive to determining that the intercepted action is permitted, determining using the security container whether any limitations are associated with the intercepted action;
   responsive to determining that a limitation is associated with the intercepted action:
      performing a virtual action corresponding to the intercepted action instead of the intercepted action itself, wherein execution of the virtual action by a security application returns a result to the interpreter analogous to a result of the intercepted action but without execution by an operating system of the intercepted action,
      determining whether the intercepted action of the interpreter is a network operation for obtaining data from a network, and responsive to determining the intercepted action of the interpreter is a network operation for obtaining data from a network, performing a corresponding virtual action comprised of reading data from a file,
      determining whether the intercepted action of the interpreter is a request to read a target file, and responsive to determining the intercepted action of the interpreter is a request to read a target file, performing a corresponding virtual action comprised of copying the target file to another location, and providing the interpreter an empty file or a file containing predetermined secure content; and
   responsive to determining that no limitations are associated with the intercepted action, executing, by the operating system, the intercepted action.

2. The method of claim 1, wherein the action limiting policies depend on one or more of a version of the operating system, a type of account record, a hardware of a computer, a network segment in which the computer is located.

3. The method of claim 1, wherein the security container stores action limiting policies that determine limits on both the actions of the interpreter and actions of script files executed by the interpreter.

4. The method of claim 1, wherein the security container stores a list of allowed disk read/write operations, and a set of allowed operations with the operating system.

5. The method of claim 1, wherein the security container stores allowed network operations governing access to a network for the interpreter.

6. The method of claim 1, wherein execution of the script file comprises:
   detecting, by the processor, an attempt by the script interpreter to execute the script file;
   determining using the security container whether the script file is a trusted script file; and
   allowing, by the processor, the script interpreter to execute the trusted script file.

7. A system for execution of script files, the system comprising:
   a data storage for storing a security container associated with a script interpreter, wherein the security container includes at least action limiting policies for the interpreter;
   a hardware processor coupled to the data storage and configured to:
      intercept actions of the interpreter during execution of a script file comprising a trusted script file;
      determine using the security container whether an intercepted action is permitted;
      responsive to determining that the intercepted action is permitted, determine using the security container whether any limitations are associated with the intercepted action;
      responsive to determining that a limitation is associated with the intercepted action:

perform a virtual action corresponding to the intercepted action instead of the intercepted action itself, wherein execution of the virtual action by a security application returns a result to the interpreter analogous to a result of the intercepted action but without execution by an operating system of the intercepted action, determine whether the intercepted action of the interpreter is a network operation for obtaining data from a network, and responsive to determining the intercepted action of the interpreter is a network operation for obtaining data from a network, the processor is further configured to perform a corresponding virtual action comprised of reading data from a file, determine whether the intercepted action of the interpreter is a request to read a target file, and responsive to determining the intercepted action of the interpreter is a request to read a target file, the processor is further configured to perform a corresponding virtual action comprised of copying the target file to another location, and providing the interpreter an empty file or a file containing predetermined secure content; and responsive to determining that no limitations are associated with the intercepted action, execute, by the operating system, the intercepted action.

8. The system of claim 7, wherein the action limiting policies depend on one or more of a version of the operating system, a type of account record, a hardware of a computer, a network segment in which the computer is located.

9. The system of claim 7, wherein the security container stores action limiting policies that determine limits on both the actions of the interpreter and actions of script files executed by the interpreter.

10. The system of claim 7, wherein the security container stores a list of allowed disk read/write operations, and a set of allowed operations with the operating system.

11. The system of claim 7, wherein the security container stores allowed network operations governing access to a network for the interpreter.

12. The system of claim 7, wherein the hardware processor configured to execute the script file is further configured to:

detect an attempt by the script interpreter to execute the script file;

determine using the security container whether the script file is a trusted script file; and allow the script interpreter to execute the trusted script file.

13. A non-transitory computer readable medium comprising computer executable instructions for execution of script files, including instructions for:

providing a security container associated with a script interpreter, wherein the security container includes at least action limiting policies for the interpreter;

intercepting actions of the interpreter during execution of a script file comprising a trusted script file;

determining using the security container whether an intercepted action is permitted;

responsive to determining that the intercepted action is permitted, determining using the security container whether any limitations are associated with the intercepted action;

responsive to determining that a limitation is associated with the intercepted action:

performing a virtual action corresponding to the intercepted action instead of the intercepted action itself, wherein execution of the virtual action by a security application returns a result to the interpreter analogous to a result of the intercepted action but without execution by an operating system of the intercepted action, determining whether the intercepted action of the interpreter is a network operation for obtaining data from a network, and responsive to determining the intercepted action of the interpreter is a network operation for obtaining data from a network, performing a corresponding virtual action comprised of reading data from a file, determining whether the intercepted action of the interpreter is a request to read a target file, and responsive to determining the intercepted action of the interpreter is a request to read a target file, performing a corresponding virtual action comprised of copying the target file to another location, and providing the interpreter an empty file or a file containing predetermined secure content; and responsive to determining that no limitations are associated with the intercepted action, executing, by the operating system, the intercepted action.

14. The non-transitory computer readable medium of claim 13, wherein the action limiting policies depend on one or more of a version of the operating system, a type of account record, a hardware of a computer, a network segment in which the computer is located.

15. The non-transitory computer readable medium of claim 13, wherein the security container stores action limiting policies that determine limits on both the actions of the interpreter and actions of script files executed by the interpreter.

16. The non-transitory computer readable medium of claim 13, wherein the security container stores a list of allowed disk read/write operations, and a set of allowed operations with the operating system.

17. The non-transitory computer readable medium of claim 13, wherein the security container stores allowed network operations governing access to a network for the interpreter.

18. The non-transitory computer readable medium of claim 13, wherein execution of the script file comprises:

detecting an attempt by the script interpreter to execute the script file;

determining using the security container whether the script file is a trusted script file; and allowing the script interpreter to execute the trusted script file.

* * * * *